United States Patent [19]

Bluhm et al.

[11] Patent Number: 4,763,253

[45] Date of Patent: Aug. 9, 1988

[54] MICROCOMPUTER WITH CHANGE OF FLOW

[75] Inventors: Mark W. Bluhm; Robert R. Thompson; David S. Mothersole; Douglas B. MacGregor, all of Austin, Tex.

[73] Assignee: Motorola, Inc., Schaumburg, Ill.

[21] Appl. No.: 931,029

[22] Filed: Nov. 17, 1986

Related U.S. Application Data

[63] Continuation of Ser. No. 655,014, Sep. 26, 1986, abandoned.

[51] Int. Cl.$^4$ .............................................. G06F 9/38
[52] U.S. Cl. .................................................. 364/200
[58] Field of Search ... 364/200 MS File, 900 MS File

[56] References Cited

U.S. PATENT DOCUMENTS 4,442,484 4/1984 Childs, Jr. et al. ................ 364/200
4,547,849 10/1985 Louie et al. ........................ 364/200
4,729,093 3/1988 Mothersole et al. ............... 364/200
4,731,736 3/1988 Mothersole et al. ............... 364/900

Primary Examiner—Gary V. Harkcom
Assistant Examiner—Christopher H. Lynt
Attorney, Agent, or Firm—John A. Fisher; Jeffrey Van Myers

[57] ABSTRACT

A microcomputer has the capacity for executing instructions, requesting prefetches of instructions, and experiencing a change in instruction flow, or a branch. The microcomputer also knows in advance that a change in instruction flow is going to occur. At such time that a branch becomes known there may also be a pending instruction prefetch request. Because a branch is going to occur, there is no need to execute the prefetch. Consequently, the pending instruction prefetch is flushed which thus avoids wasting time making an unnecessary instruction prefetch.

7 Claims, 11 Drawing Sheets

** SPECIAL CASE EXIT CONDITIONS FOR IS5 [SCEXIT]
  A] CURRENT OP = EV3F & OD3F
  B] CURRENT OP = TOAD & ODD ADDRESS
  C] CURRENT OP = FIRST ACCESS AFTER RETURN & ODD ADDRESS
  D] CURRENT OP = FIX1 OR FIX2

ALL SCEXIT CONDITIONS, 3UDI REQUESTS, AND TOAD REQUESTS WILL CAUSE AN EXTRA CYCLE OF CLOCK DELAY AFTER LEAVING IS5

NOTE - STATE MACHINE SAMPLES INPUTS ON PH2 AND CHANGES STATE ON PH1

MICROCOMPUTER WITH CHANGE OF FLOW

CROSS-REFERENCE TO RELATED APPLICATIONS

This is a continuation, of application Ser. No. 655,014, filed 9/26/86, now abandoned.

Related subject matter is disclosed in the following related applications filed simultaneously herewith and assigned to the assignee hereof.

(1) U.S. patent application No. SC-05535A entitled, "Method and Apparatus For Scheduling Enternal Bus Accesses".

(2) U.S. patent application No. SC-00008A entitled, "Microcomputer Which Prioritizes Instruction Prefetch Requests and Data Operand Requests".

FIELD OF THE INVENTION

The invention relates to microcomputers which have a change in flow capability, and more particularly to microcomputers which have outstanding instructions and/or data requests when a change of flow occurs.

BACKGROUND OF THE INVENTION

Microcomputers typically have the capacity for making instruction prefetch requests and requests for operands before they are actually needed by the microcomputer. These requests are then placed in queue until such time as they can be obtained, typically from external memory.

Microcomputers, during the execution of instructions, however, will sometimes have a change in flow, also called a branch. An example of a branch is a compare function with alternate destinations; if A is greater than B, go to C, otherwise go to D. When a branch occurs, it means that the previously requested instructions and data which were in anticipation of circumstances which are now not going to happen, are no longer useful. In the prior art the previously requested data or instructions were fetched anyway. The reason was because the requests were executed in the order in which they were received. But even if they were not executed in the order received, an attempt to prioritize between pending data and instruction requests would still result in wasting the time-executing a fetch of information that was not going to be used.

SUMMARY OF THE INVENTION

An object of the invention is to provide an improved technique for prioritizing usage of an external bus of a microcomputer.

Another object is to provide a microcomputer with an improved response to an anticipated change in flow.

Yet another object of the invention to provide a technique for improved usage of an external bus of a microcomputer when a change in flow is anticipated.

These and other objects are achieved in a microcomputer which has a processing unit, a bus controller, a detection circuit, and a flushing circuit. The processing unit processes instructions, requests prefetches of instructions, and requests data for use in the execution of instructions. The bus controller establishes an order for providing the instructions and data to the processing unit. The detection circuit detects that a change in flow is to occur. The flushing circuit flushes the instruction and data requests from the bus controller in response to a detection that a change in instruction flow is going to occur.

DESCRIPTION OF THE INVENTION

Figure 1:
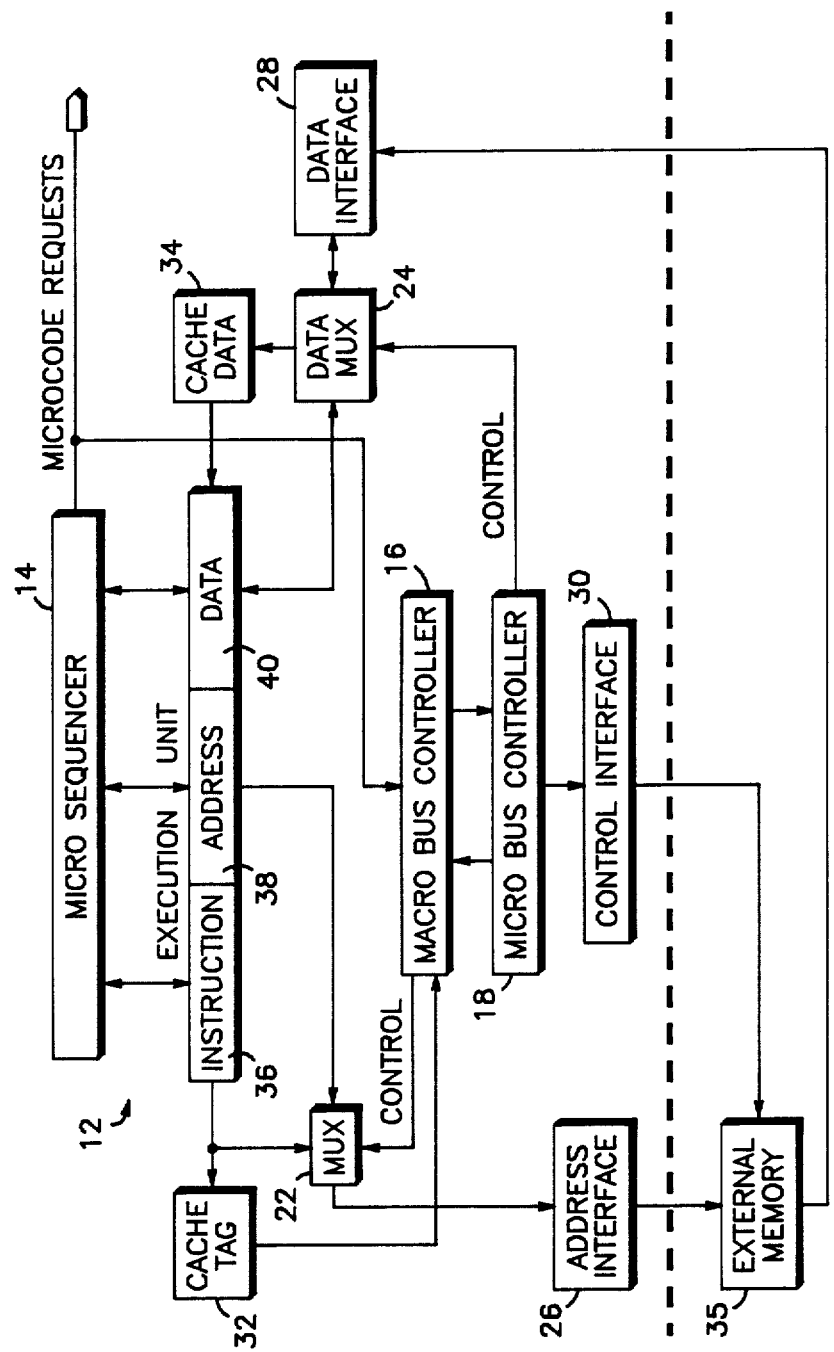
FIG. 1 is a block diagram for a microcomputer having a macro bus controller according to a preferred embodiment of the invention.

Shown in FIG. 1 is an integrated circuit microcomputer 10 comprised generally of an execution unit 12, a micro sequencer 14, a macro bus controller 16, a micro bus controller 18, a cache 20, an address multiplexer 22, a data multiplexer 24, an address interface 26, a data interface 28, and a control interface 30. Cache 20 has a TAG portion 32 and a data portion 34. Also shown in FIG. 1 is an external memory 35 which is external to microcomputer 10. Execution unit 12 executes an instruction as dictated by microinstructions from micro sequencer 14. As part of processing microinstructions, operands and instructions are prefetched. A prefetched instruction may be located in cache 20. TAG portion 32 decides if the prefetched instruction is located in cache 20. If so, TAG portion 32 provides an indication of this be providing a HIT signal. If there is a hit in cache 20 (the prefetched instruction is in cache 20), data portion 34 provides the instruction to micro sequencer 14.

Execution unit 12 is in three parts; an instruction part 36, an address part 38, and a data part 40. Although data part 40 can receive both operands and instructions from external memory 35, via data interface 28, and instructions form data portion 34 of cache 20, only one at a time can be received. Address part 38 provides addresses for the instructions. Both operand (data) and instruction addresses are input to multiplexer 22. Multiplexer 22 is controlled by macro bus controller 16. Macro-controller 16 makes a determination between three choices for multiplexer 22; the operand address from execution unit 12 is coupled to address interface 26, the instruction address from execution unit 12 is coupled to address interface 26, or neither the instruction address nor the operand address are coupled to address interface 26. Address interface 26 couples addresses to external memory 35 under the timing control of micro bus controller 18. External memory 35 provides the contents of the addressed location in memory to data interface 28. Alternatively, data may be written into the addressed memory location as provided by execution unit 12. If an instruction was addressed, the instruction received by data interface 28 will be written into data portion 34 of cache 20 via multiplexer 24 under the control of micro bus controller 18. Micro bus controller 18 also provides control signals via control interface 30 which provide control of external memory 35. Details of a bus controller suitable for use as micro bus controller 18 in FIG. 1 is disclosed in detail in the U.S. patent application of Mothersole et al, Ser. No. 624,600, entitled "DATA PROCESSOR HAVING DYNAMIC BUS SIZING", filed 6/26/84, and assigned to the assignee here of.

The operations of microcomputer 10 are synchronized by internal and external clocks. The external clocks are PH1 and PH2 which are complements of each other. Internal clocks are T1, T2, T3, and T4 which occur sequentially. A clock is said to occur or to be in being when it is a logic high. During a certain PH1, T1 is in being. During the next following PH1, T3 is in being. During a certain PH2, T2 is in being. During the next following PH2, T4 is in being. Another time period of significance which sometimes occurs is referenced as T4 bar. This occurs when T1–T4 are suspended. For a time equal to PH1, none of the clocks T1–T4 occur. A T4 always follows T4bar. Suspension of the clocks can be referred to as T4 bar/T4.

Instruction portion 36 and address portion 38 of execution unit 12 each have an address output buffer (AOB) register for storing an address to be supplied to external memory when selected by macro bus controller 16. Instruction portion 36 has AOBP, and address portion 38 has AOBA for this purpose. AOB's can be loaded on PH1 only, and can be clocked to enternal memory no earlier than the next following PH1. A bus cycle is considered to be the time required for data interface 28 to latch information from external memory or some other external resource after the address in an AOB has been clocked to external memory via address interface 26. Bus cycles are performed under the control of micro bus controller 18. The mimimum time is three PH1's and three PH2's. One microinstruction requires a T1–T4 sequence. Consequently, for a microinstruction to have data available by T3, the address for the data (operand) must have been clocked onto the external address bus by at least T1 of the preceding microinstruction. A bus cycle begins internally when an address is clocked from an AOB to external memory. This adds an extra PH1 and PH2. If an AOB to be clocked to external memory is loaded on T1, then the output to external memory from address interface 26 will not begin until T3. If loading occurs on T3, then the output to external memory cannot begin until the next T1 or T4bar if a T4bar follows T4.

The following terms are used by microcode to describe the two types of cycles:

(1) T1 Initiate—In this case an AOB is loaded on T1 (or before), and the bus cycle should start on the next T3.

(2) T3 Initiate—In this case AOB is loaded on T3 (or before), the bus cycle should start on the next equivelent T1 time. This can be a T4bar time.

(3) T0 Initiate—In this case AOB is loaded sometime in a previous microinstruction, and the bus cycle must start on the next T1 time.

Use of cache 20 for storing instructions dramatically speeds the instruction execution rate of microcomputer 10 when the prefetched instructions are in cache 20.

The situation in which a prefetched instruction is in cache 20, is called a hit and is so signalled by a signal called HIT being a logic high. The situation in which a prefetched instruction is not in cache 20 is called a miss and HIT is a logic low. HIT is provided by TAG part 32 of cache 20 to macro controller 16.

Figure 2:
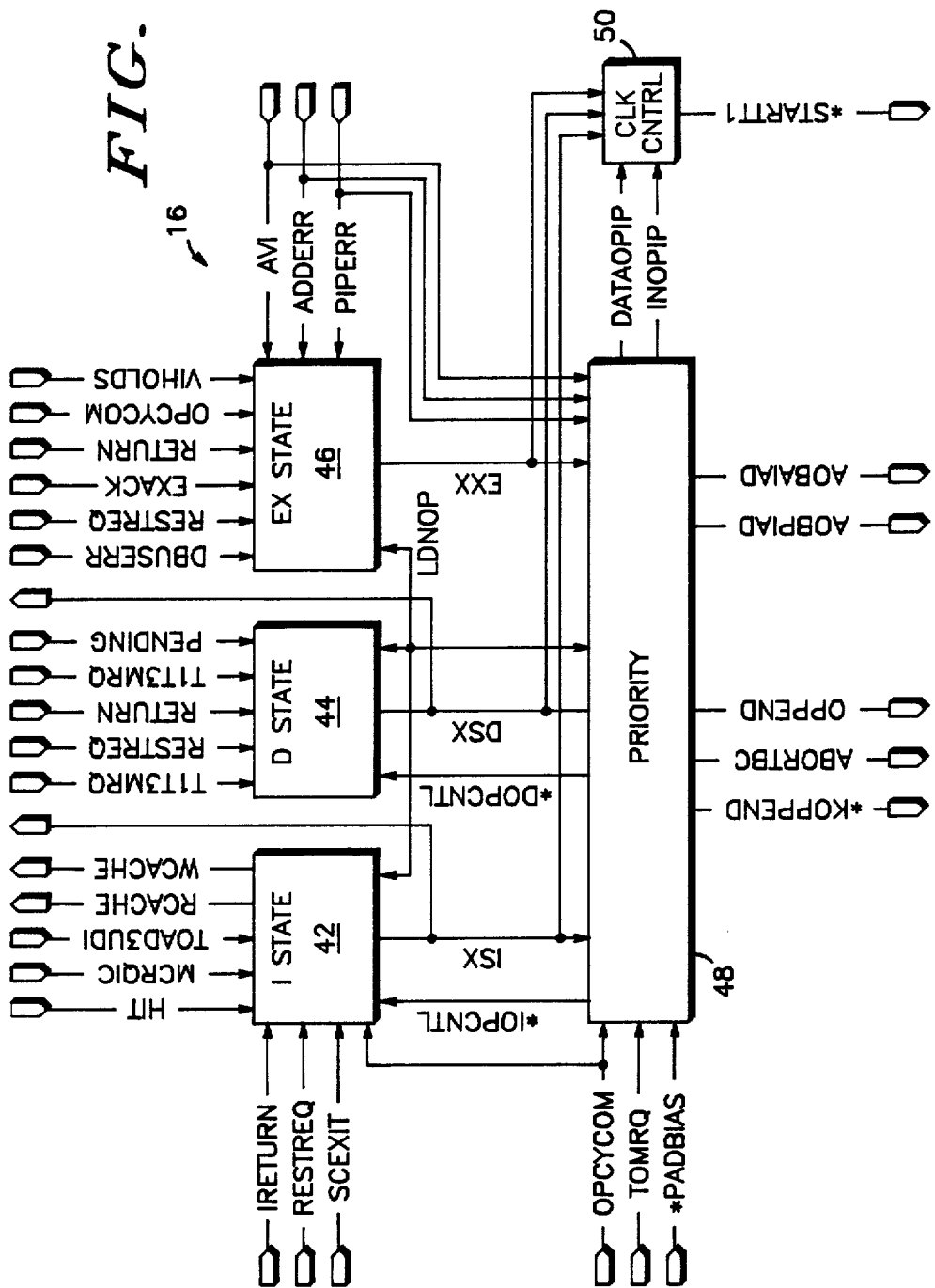
FIG. 2 is a block diagram of the macro bus controller of FIG. 1 according to a preferred embodiment of the invention.

Shown in FIG. 2 is macro controller 16 comprised generally of an instruction state machine (ISTATE) 42, a data state machine (DSTATE) 44, an exception state machine (EXSTATE) 46, a priority machine (PRIORITY) 48, and a clock controller (CLK CNTRL) 50. ISTATE 42, DSTATE 44, and EXSTATE 46 keep track of the state of instruction requests, data requests, and exceptions, respectively. PRIORITY 48 controls the selection between an instruction fetch and a data request and also controls suspension of the internal clocks via CLK CNTRL 50.

Macro bus controller 16 has the ability to suspend the internal time clocks, that is, put them into a T4—T4-bar—T4—T4bar, etc. sequence. This is necessary whenever the bus cycles requested by the microcode are queued up to a point that the data from a requested bus cycle is needed to proceed or resources being used by macro bus controller 16 are needed by execution unit 12 or a pipe portion of micro sequencer 14. The pipe, as is conventional, is used to store instructions which are to be sequentially used. A prefetched instruction is stored in the pipe, so it will then be used in its proper time. The following conditions cause the macro bus controller to suspend the clocks:

(1) DSTATE 44 controls the scheduling of data operand cycles. It will suspend the clocks for the following conditions.

(a) Access Pending: If a requested data cycle has not been accepted by micro bus controller 18 by the end of the microinstruction that issued the request, the clocks are suspended until it is accepted.

(b) Read Not Complete: If a microinstruction which contains a read cycle is currently running and the next microinstruction will use the information being read, the clocks are suspended until the read cycle is complete. A read cycle is completed by coupling information stored in data interface 28 to data portion 40 of execution unit 12.

(c) Write Not Complete: If a microinstruction which contains a write cycle is currently running and the next microinstruction will place information into a data output buffer (dob) register, the clocks are suspended until the write cycle is complete. The dob is the register from which writes are initiated. The dob can also be used as a temporary storage location but not until the previous write cycle is complete.

(d) T0 Access Pending: If a T0 access will occur in the next microinstruction, and micro bus controller 18 is not ready to accept the T0 access by the end of the current microinstruction, then the clocks are suspended until micro bus controller 18 will accept and start the T0 access on the next T1.

(2) ISTATE 42 controls the scheduling of instruction prefetch cycles, all prefetch cycles access cache 20 for an instruction before attempting an external access. The following conditions cause ISTATE 42 to suspend the clocks.

(a) 3 Word Prefetch: All 3 word prefetch activity must be completed in the microinstruction in which it was initiated. This is because a three world prefetch occurs only if the instructions stored in the pipe are no longer valid. There must be time allowed for the pipe to be loaded with a valid instruction.

(b) IRB Source: If an instruction cycle is currently pending completion, and IRB will be used in the next microinstruction, the clocks must be suspended until the instruction prefetch cycle is complete. IRB is a location in the pipe which is loaded with the results of an instruction prefetch.

ISTATE 42 serves as a general control over cache access, hit/miss determination, and scheduling external instruction accesses. ISTATE 42 has various states indicative of the state of instruction requests. This state machine does not sample exceptions, but does indicate to the ESTATE 46 when it can be interrupted.

State IS0 is a reset state. In general, no actions are initiated in this state. Besides reset, this state is used when a hit has occured but the clocks remain in T4bar-T4. IS0 can be entered from state IS5 which is an external access (see description below). When this occurs, the implication is that any access in the microinstruction which next fetches an instruction may be considered as a Forced Hit which means that cache 20 will contain the next instruction. This is true because the external bus is 32 bits but an instruction is 16. Any external instruction fetch on an even word boundary will result in also obtaining the next instruction which is automatically loaded into cache 20. Consequently, the next prefetch is ensured of being a hit. This state is a valid instruction holding state. That is, it is an interruptable state for exception processing. This state is forced when a LDNOP occurs. LDNOP is signal generated by EX-STATE 46 that initiates exception processing.

| Condition | Actions |
| --- | --- |
| T4 = 1 | Remain in IS0 state. |
| When PH2 = 1, T4 = 0 (implies T2) | Go to IS1 |

State IS1 is the only state in which cache 20 is accessed. In typical operation, this will only occur during a T3-T4 sequence. However, if ISTATE 42 is trying to complete instruction access, and a 3UDI or TOAD request occurs, the current instruction fetch is ignored, and cache 20 is accessed to see if the 3UDI or TOAD access is a hit. Under these conditions, a cache access can occur during T4bar-T4 sequence. A TOAD is a change of flow request. The 3UDI instruction is a three word prefetch request which implies a change of flow. The three word fetch is for reloading the pipe with valid instructions. The pipe is three words deep. If a two word pipe were used, much the same considerations would be required because the contents of the pipe would still be invalid upon a change in flow or branch and would thus have to be reloaded in order to begin a valid instruction. If a TOAD or 3UDI is requested in the next microinstruction and if in FS5, then the next state will be IS0 or IS2. Likewise, the current request is advantageously ignored because it is certain to not be used. To fetch the current request is known to be a waste of time because of the fact that a branch is anticipated. If no instruction access is requested, then the next state will be IS0. When in state IS1 ISTATE 42 will always be able to see what is requested in the next microinstruction.

| Condition | Action |
| --- | --- |
| Instruction access requested | Go to IS3. |
| No instruction access requested | Go to IS0. |

State IS3 is the only state that is used to determine a cache hit/miss. Depending on hit or miss, many different actions can occur. This state can only occur during a T1-T2 or a T4bar-T4 sequence. If a cache hit occurs, then:

(1) If T4=1, the clocks are in T4bar-T4 sequence, and the cache access that occurred was for the microinstruction that will start on the next T1. Under these conditions, the hit is valid, and the next state will be IS0, where the state machine will remain until the clocks start sequencing.

(2) If T4=0, the clocks are sequencing normally, and the next state will be IS1 in order to initiate a cache access for the microinstruction that will start on the next T1.

If a cache miss occurs, then:

(1) If micro bus controller 18 accepts the external cycle, then the next state will be IS5. Under these conditions, the access that is underway is for the current T1-T4 sequence. That is, there should be no circumstances under which the clocks will be held and an external instruction cycle is initiated for a microinstruction that has not been entered yet. This is true since there are only four general conditions that can cause a clock halt, and, as discussed below, each of these conditions can not produce an external instruction access for a microinstruction that has not been entered.

(a) The clocks are halted due to uncompleted data access. Under these conditions, the external instruction access will be locked off the external bus, and an instruction access could not be initiated.

(b) The clocks are halted due to unaccepted data access. Under these conditions, the data operation has priority, and an instruction access should be locked out.

(c) The clocks are halted due to uncompleted an instruction access. This does, not apply here.

(d) The clocks are halted due to a pending exception. Since exceptions lock out requests to micro bus controller 18, the instruction access should not occur.

(2) If T4=1 and micro bus controller 18 did not start the external cycle, the clocks are in a T4bar-T4 sequence and the access that is under way is for the microinstruction that will start on the next T1. Under these conditions, the next state should be IS8. IS-TATE 42 should still try to initiate the access, since as discussed above, the external cycle will either not occur due to a pending exception, or the cycle will start and the microinstruction that is initiating the external cycle will be entered.

(3) If T4=0 (implies T2) and micro bus controller 18 did not start the external cycle, the clocks are not being held, and the external cycle is for the current T1-T4 cycle. The next state will be IS4.

| Condition | Actions |
|---|---|
| Hit & T4 = 1 | Go to IS0. |
| Hit & T4 = 0 | Go to IS3. |
| Miss 4 = 1 | Go to IS8. |
| Miss & T4 = 0 | Go to IS4. |

State IS4 is used to indicate that a cache during miss has occurred for the current T1-T4 and was not accepted externally. That is, there is a valid external instruction fetch that is pending. Clocks should be halted if there is another instruction fetch in the next microinstruction. During IS4, ISTATE 42 should also try to get control over the external bus (although not with as high a priority as a pending data operation). In addition, during IS4, ISTATE 42 locks out *PADBIAS from attempting to prioritize the micro machine for data operations. PADBIAS is a signal which indicate coprocessor or other heavy data activity and gives data operations higher priority. The pending instruction fetch should be aborted, if a 3UDI or TOAD op is seen in an upcoming microinstruction. This is done since a 3UDI or TOAD op indicates that the current fetch is superfluous and the entire pipe is going to be updated. Under these conditions, ISTATE 42 immediately goes to IS1 and initiates a cache access for the 3UDI or TOAD access. The clocks should be halted since there is a pending instruction access (ISTATE 42 is in IS4) and another instruction access is coming up in the next microinstruction (the 3UDI or TOAD access). The clocks will remain halted during the IS1 access, allowing cache 20 to set up to determine hit/miss, and (assuming no other clock halt conditions), the IS3 following the IS1 will occur during T1-T2. The IS4 state is maintained until a 3UDI or TOAD is seen or micro bus controller 18 accepts the external cycle. This state is a valid instruction holding state. That is, it is an interruptable state for exception processing. If this state is interrupted for exception processing, then the appropriate Not Done bit(s) should be set in SSWB. SSWB is a register which stores conditions present when an exception becomes effective.

| Condition | Actions |
|---|---|
| Request not accepted | Remain in IS4. |
| Request accepted | Go to IS5. |
| 3UDI or TOAD op occurs | Go to IS1. Clear Rerun & Not Done bits in SSWB. Perform AOBPT→AOBP transfer. |

State IS8 is used to indicate that a cache miss has occurred for a microinstruction that has not been entered. As long as the clocks are being held, the state machine should loop in this state. The exit conditions are that the clocks are not being held any longer (T4=0, implied T2) and the external cycle was not accepted, in which case IS4 should be the next state to indicate there is a valid instruction fetch pending. If the external cycle is accepted by micro bus controller 18, then the implication is that the clocks are no longer being held, and the next state will be IS5. This state is a valid instruction holding state. That is, it is an interruptable state for exception processing. This state is used to indicate that a cache miss has occurred for a microinstruction that has not been entered yet. If this state is interrupted for exception processing, unlike state IS4, Not Done bit(s) of SSWB should not be set because the microinstruction had not been entered.

| Condition | Action |
|---|---|
| T4 = 1 & request not accepted | Remain in IS8. |
| Request accepted | Go to IS5. |
| T4 = 0 request not accepted | Go to IS4. |

State IS5 is used to indicate that micro bus controller 18 has accepted an external instruction fetch, but it has not yet been completed. This state should be maintained until one of two general exit conditions occurs:
  (a) A 3UDI or TOAD request is seen in the next microinstruction.
  (b) The external access completes either due to a bus error or a normal cycle termination.

These are the two general exit conditions, but the next state is determined by other conditions that ISTATE 42 monitors. These are referred to as Special Case EXIT conditions (SCEXIT) which are indicated by a signal SCEXIT which will cause the clocks to be held until one cycle after completion. The only other exit condition that causes an extra cycle of clock delay after IS5 is an upcoming 3UDI or TOAD request. The extra cycle of clock delay is inserted to allow another cache access (IS1) to occur before entering the next microinstruction. These SCEXIT conditions imply that a forced hit will not be possible, and that a cache access is necessary before entering the microinstruction. The exit conditions, next state, and conditional actions taken by state IS5 are discussed below.

(1) A 3UDI or TOAD op is requested in the next microinstruction. Under these conditions, the current external access is superfluous and can be ignored. Consequently, ISTATE 42 flushes this access by making the next state IS1 where cache 20 will be accessed with the 3UDI or TOAD address. The current external access can be ignored since there are only two termination modes for an external access (normal and bus error) and either will cause any unwanted side effects. That is, if the bus cycle terminates normally, then the next access pending (which could be the 3UDI or TOAD access if it resulted in a miss) will be allowed to start. Should a bus error occur, then, since there is an instruction cycle underway, hardware will provide a bus error acknowledge (BERACK) to reset micro bus controller 18. Accessing cache 20 (IS1) should occur under T4bar-T4 sequence since there is an instruction access underway and another instruction access (the 3UDI or TOAD) is being requested in the next microinstruction. The earliest that the external cycle could complete would be the T4 of the IS1 access, which should allow the normal lead time for the cache access. However, if the external cycle happened to finish up on the same T4 that the 3UDI or TOAD request is first seen, then there could potentially be no reason for the clocks to delay. To solve this, a forced clock delay is inserted if a 3UDI or TOAD occurs during an IS5.

(2) The cycle is terminated and there is an SCEXIT. This exit condition is very similar to the arrival of a 3UDI or TOAD, except that the external cycle is allowed to complete before exiting IS5. The next state will be IS1 where a cache access is performed in preparation for the next microinstruction.

(3) The external instruction access is completed and there is no upcoming 3UDI or TOAD and T4=1.

This occurs under normal operation, that is, an instruction flow with no change of flow (no branch). After an external instruction cycle, cache 20 will always contain a valid instruction for an address on an odd word boundary. This will always be true unless there is a change of flow. Under this assumption, the instruction access following a miss will always be in cache 20, and further, possible misses will only occur on even addresses. This mechanism of predicting hits on odd word addresses is referrred to as a Forced Hit. When the current external instruction access completes, the next state will be IS0.

(4) The external instruction access completes and T4=0 (implied T2). The next state should be IS1 to initiate a cache access.

| Condition | Actions |
|---|---|
| 3UDI or TOAD request | Go to IS1. Force Clock halt. |
| SCEXIT and Cycle completes | Go to IS1. Force Clock halt. |
| T4=∅ & Cycle completes | Go to IS1. |
| T4=1 & no SCEXIT & no (3UDI or TOAD request) & Cycle completes. | Go to IS∅. |

State IS11 is used as an exception restore state. The primary function is to allow the microcode to restore the state of SSWB before attempting to restore the pipe. The entry to this state is by a Restore Request, and exit from this state is by an Istate Return signal IRETURN. IRETURN is simply a delayed version of Write to SSWB, which indicates that the microcode has restored SSWB.

| Condition | Actions |
|---|---|
| No Istate Return | Remain in IS11. |
| Istate Return | Go to IS∅. |

ISTATE 42 samples inputs on PH2 and changes state on PH1. The inputs used by the ISTATE 42 are as follows:

IRETURN—Instruction state return. This input indicates that the microcode has restored SSWB during an RTE (return from exception), and is a delayed Write to SSWB.

RESTREQ—Restore Request. This is an indication that the SSWB is being restored in response to an RTE.

IOPCNTL—Instruction Operand Control. This signal indicates that micro bus controller 18 will start an external instruction cycle on the next PH1.

T4—Clock signal.

OPCYCOM—Operand Cycle complete. This signal from micro bus controller 18 indicates that the current operand cycle is complete. An operand may be in more than one address location. Consequently, more than one fetch may be required. This indicates the operation is complete regardless of the number of fetches required.

HIT—Hit signal from cache. This signal is only valid for the PH1 following a cache access.

TOAD3UDI—Indicates one of TOAD or 3UDI.

MCRQIC—Microcode Request Instruction Cycle. This indicates that the microcode is requesting an instruction fetch.

SCEXIT—Latched signal to indicate that the current instruction fetch is a Special Case Exit Condition.

LDNOP—Load No Op. This input forces IS0 as the next state, regardless of the current state.

The following state table shows the current state, the inputs sampled during that state, and the next state based on those inputs.

| current state | IRETURN | RESTREQ | IOPCNTL | T4 | OPCYCOM | HIT | TOAD3UDI | MCRQIC | SCEXIT | next state | |
|---|---|---|---|---|---|---|---|---|---|---|---|
| IS∅ | X | X | X | ∅ | X | X | X | X | X | IS1 | |
|  | X | X | X | 1 | X | X | X | X | X | IS∅ | |
| IS1 | X | 1 | X | X | X | X | X | X | X | IS11 | Assuming no |
|  | X | X | X | X | X | X | X | ∅ | X | IS∅ | simultaneous |
|  | X | X | X | X | X | X | X | 1 | X | IS3 | MCRQIC & RESTREQ |
| IS3 | X | X | X | 1 | X | 1 | X | X | X | IS∅ | |
|  | X | X | X | ∅ | X | 1 | X | X | X | IS1 | |
|  | X | X | ∅ | 1 | X | ∅ | X | X | X | IS8 | |
|  | X | X | ∅ | ∅ | X | ∅ | X | X | X | IS4 | |
|  | X | X | 1 | X | X | ∅ | X | X | X | IS5 | |
| IS4 | X | X | X | X | X | 1 | X | X | X | IS1 | |
|  | X | X | ∅ | X | X | X | ∅ | X | X | IS4 | |
|  | X | X | 1 | X | X | X | ∅ | X | X | IS5 | |
| IS5 | X | X | X | X | ∅ | X | ∅ | X | X | IS5 | |
|  | X | X | X | X | X | X | 1 | X | X | IS1 | |
|  | X | X | X | 1 | 1 | X | ∅ | X | ∅ | IS∅ | |
|  | X | X | X | ∅ | 1 | X | X | X | X | IS1 | |
|  | X | X | X | X | 1 | X | X | X | 1 | IS1 | |
| IS8 | X | X | ∅ | 1 | X | X | X | X | X | IS8 | |
|  | X | X | ∅ | ∅ | X | X | X | X | X | IS4 | |
|  | X | X | 1 | X | X | X | X | X | X | IS5 | |
| IS11 | ∅ | X | X | X | X | X | X | X | X | IS11 | |
|  | 1 | X | X | X | X | X | X | X | X | IS∅ | |

Assigning the following coding for the instruction states:

IS0=0000
IS1=0001
IS3=0010
IS4=0011
IS5=0100
IS8=0101
IS11=0110

Then the state table becomes:

| current state | | | | inputs | | | | | | | | | next state | | | |
|---|---|---|---|---|---|---|---|---|---|---|---|---|---|---|---|---|
| MBCIS3 | MBCIS2 | MBCIS1 | MBCIS∅ | IRETURN | RESTREQ | IOPCNTL | T4 | OPCYCOM | HIT | TOAD3UDI | MCRQIC | SCEXIT | MBCIS3 | MBCIS2 | MBCIS1 | MBCIS∅ |
| ∅ | ∅ | ∅ | ∅ | X | X | X | ∅ | X | X | X | X | X | ∅ | ∅ | ∅ | 1 |
|  |  |  |  | X | X | X | 1 | X | X | X | X | X | ∅ | ∅ | ∅ | ∅ |

-continued

| current state | | | | inputs | | | | | | | | | next state | | | |
|---|---|---|---|---|---|---|---|---|---|---|---|---|---|---|---|---|
| | | | | I R E S R E Q | R E S R E Q | I O P C N T R | | O P C Y C T O M | | T O A D 3 P F I | M C R Q I C | S C E X I T | | | | |
| M B C I S 3 | M B C I S 2 | M B C I S 1 | M B C I S 0 | | | | T 4 | | H I T | | | | M B C N I S 3 | M B C N I S 2 | M B C N I S 1 | M B C N I S 0 |
| 0 | 0 | 0 | 1 | X | 1 | X | X | X | X | X | X | X | 0 | 1 | 1 | 0 |
|   |   |   |   | X | X | X | X | X | X | X | 0 | X | 0 | 0 | 0 | 0 |
|   |   |   |   | X | X | X | X | X | X | X | 1 | X | 0 | 0 | 1 | 0 |
| 0 | 0 | 1 | 0 | X | X | X | 1 | X | 1 | X | X | X | 0 | 0 | 0 | 0 |
|   |   |   |   | X | X | X | 0 | X | 1 | X | X | X | 0 | 0 | 0 | 1 |
|   |   |   |   | X | X | 0 | 1 | X | 0 | X | X | X | 0 | 1 | 0 | 1 |
|   |   |   |   | X | X | 0 | 0 | X | 0 | X | X | X | 0 | 0 | 1 | 1 |
|   |   |   |   | X | X | 1 | X | X | 0 | X | X | X | 0 | 1 | 0 | 0 |
| 0 | 0 | 1 | 1 | X | X | X | X | X | X | 1 | X | X | 0 | 0 | 0 | 1 |
|   |   |   |   | X | X | 0 | X | X | X | 0 | X | X | 0 | 0 | 1 | 1 |
|   |   |   |   | X | X | 1 | X | X | X | 0 | X | X | 0 | 1 | 0 | 0 |
| 0 | 1 | 0 | 0 | X | X | X | X | 0 | X | 0 | X | X | 0 | 1 | 0 | 0 |
|   |   |   |   | X | X | X | X | X | X | 1 | X | X | 0 | 0 | 0 | 1 |
|   |   |   |   | X | X | X | 1 | 1 | X | 0 | X | 0 | 0 | 0 | 0 | 0 |
|   |   |   |   | X | X | X | 0 | 1 | X | X | X | X | 0 | 0 | 0 | 1 |
|   |   |   |   | X | X | X | 1 | 1 | X | X | X | 1 | 0 | 0 | 0 | 1 |
| 0 | 1 | 0 | 1 | X | X | 0 | 1 | X | X | X | X | X | 0 | 1 | 0 | 1 |
|   |   |   |   | X | X | 0 | 0 | X | X | X | X | X | 0 | 0 | 1 | 1 |
|   |   |   |   | X | X | 1 | X | X | X | X | X | X | 0 | 1 | 0 | 0 |
| 0 | 1 | 1 | 0 | 0 | X | X | X | X | X | X | X | X | 0 | 1 | 1 | 0 |
|   |   |   |   | 1 | X | X | X | X | X | X | X | X | 0 | 0 | 0 | 0 |

ISTATE 42 implemented in a tree decode PLA. The decodes are arranged on a bit by bit basis and therefore it is only necessary to decode the terms that produce a 1 in the corresponding next state bit. The decodes for NMBCIS0=1 are:

| current state | | | | inputs | | | | | | | | |
|---|---|---|---|---|---|---|---|---|---|---|---|---|
| M B C I S 3 | M B C I S 2 | M B C I S 1 | M B C I S 0 | I R E S R E Q N | R E S R T E R Q L | I O P C N T R | T 4 | O P C Y C T O M | H I T | T O A D 3 P F I C | M C R Q I T | S C E X I T |
| 0 | 0 | 0 | 0 | X | X | X | 0 | X | X | X | X | X |
| 0 | 0 | 1 | 0 | X | X | X | 0 | X | 1 | X | X | X |
| 0 | 0 | 1 | 0 | X | X | 0 | X | X | 0 | X | X | X |
| 0 | 0 | 1 | 1 | X | X | X | X | X | X | 1 | X | X |
| 0 | 0 | 1 | 1 | X | X | 0 | X | X | X | 0 | X | X |
| 0 | 1 | 0 | 0 | X | X | X | X | X | X | 1 | X | X |
| 0 | 1 | 0 | 0 | X | X | X | 0 | 1 | X | X | X | X |

Figure 3:
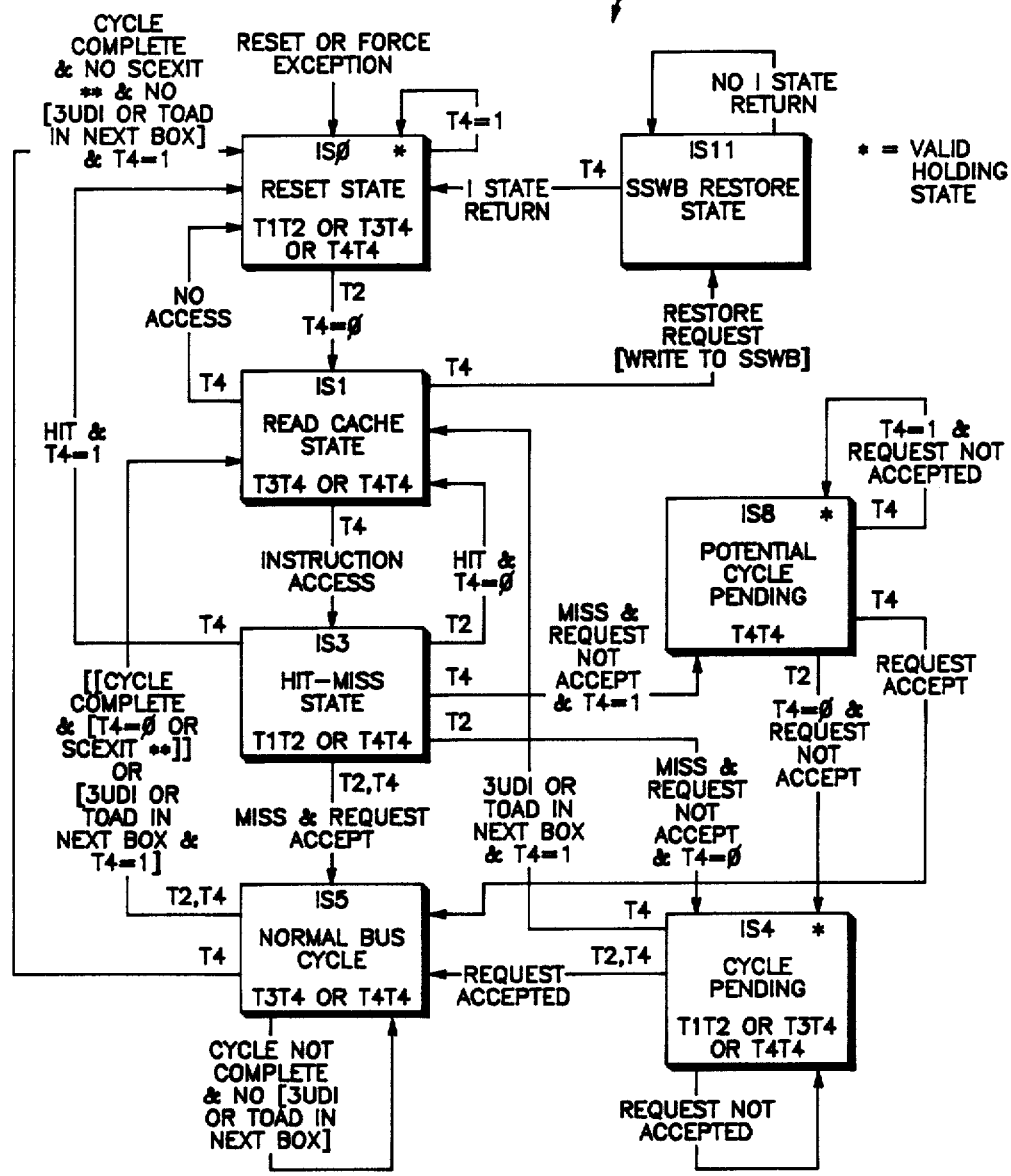
FIG. 3 is a state diagram of an instruction state machine forming part of the macro bus controller of FIG. 2.
Figure 4A:
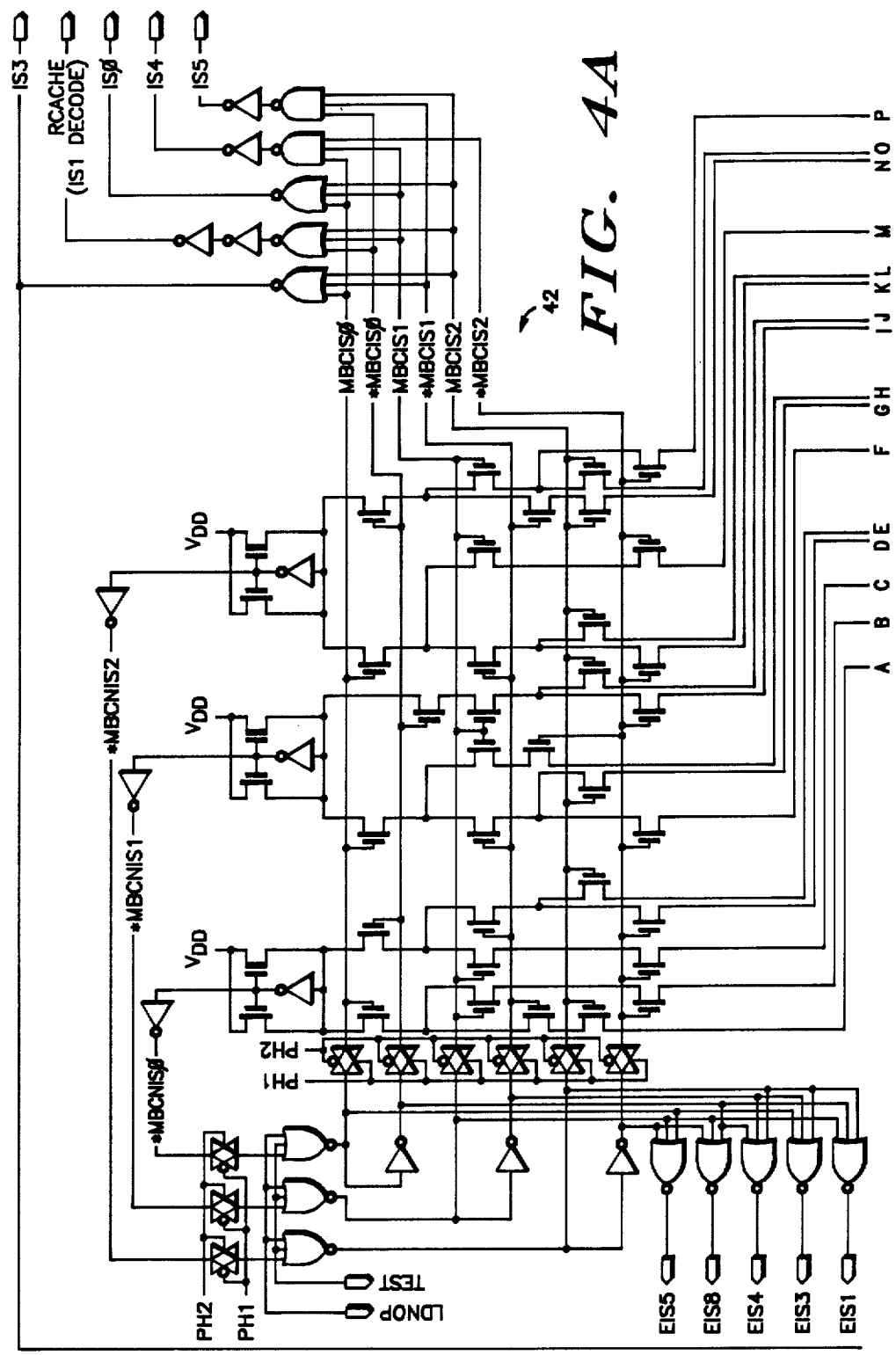
FIG. 4 is a diagram of a circuit for implementing the state diagram of FIG. 3.
Figure 4B:
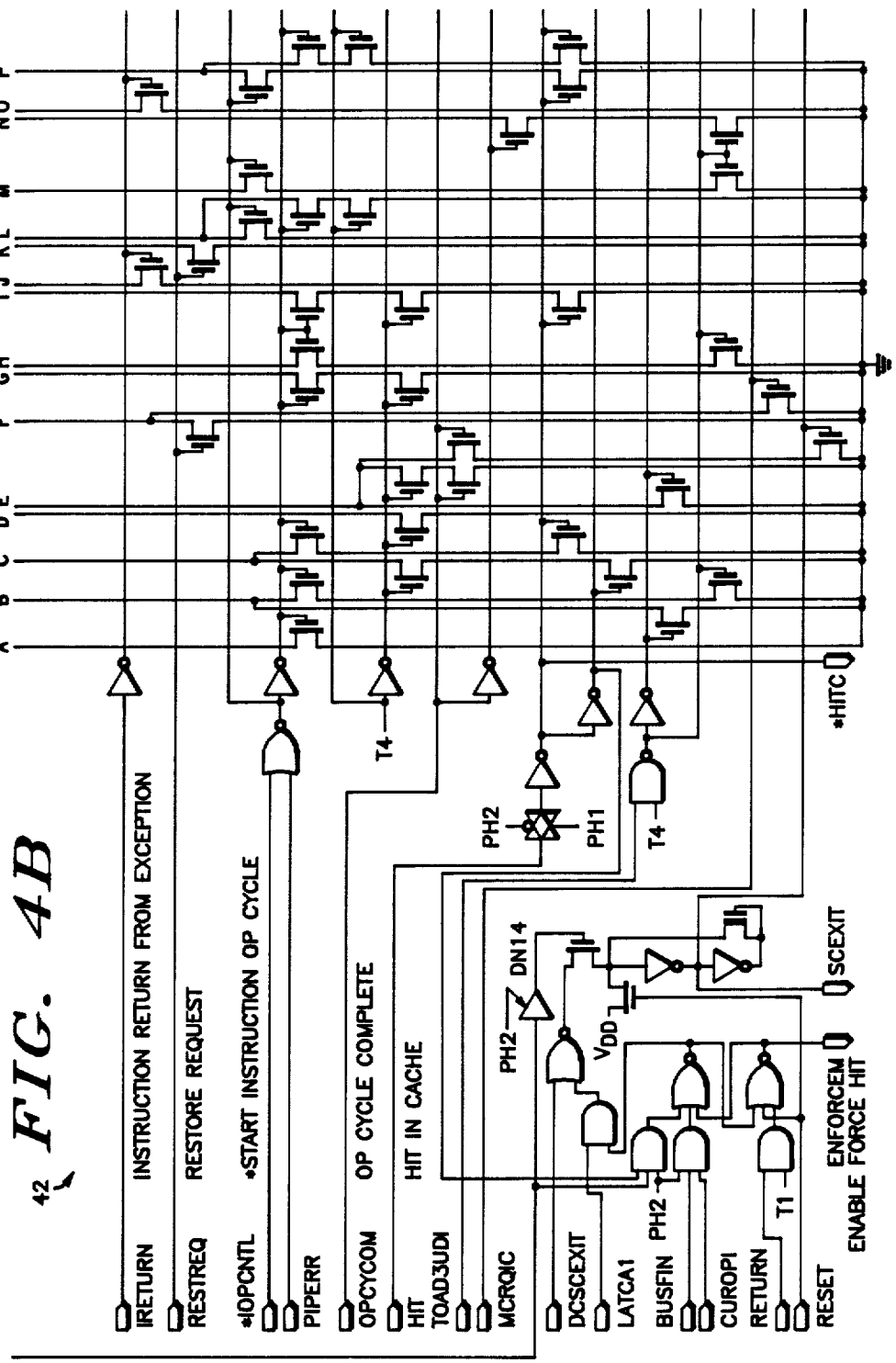

A state diagram of ISTATE 42 is shown in FIG. 3. A circuit for implementing the state diagram of FIG. 3 is shown in FIG. 4. ISTATE 42 provides decoding so that there is a separate signal for each state that is required to be communicated outside ISTATE 42. State IS0 is communicated by signal IS0. State IS1 is communicated by signal EIS1. The prefix "E" means that the signal is clocked on the preceding PH2 whereas the absence of the prefix "E" means the signal is clocked on the following PH1. The "E" signals are "early". State IS3 is communicated by signal EIS3. State IS4 is communicated by signals EIS4 and IS4. State IS5 is communicated by signals EIS5 and IS5. State IS8 is communicated by signals EIS8. State IS11 is for purposes internal to ISTATE 42 and need not be communicated outside ISTATE 42, whereas, ISTATE 42 is primarily for providing information useful for controlling micro bus controller 18, ISTATE 42 can also be used for generating additional signals useful to other parts of microcomputer 10.

DSTATE 44 serves as a general control over all data accessed except T0 accesses. This control includes scheduling accesses and handling RTE (return from exception instruction) processing, but does not include exception processing. T0 accesses are a special case of data access since they are defined such that they are only initiated during T1 unless the clocks are going to be held in T4-T4bar sequencing. This requirement of no clock hold means that T0 accesses can be considered as self-synchronizing and are handled in hardware and not by DSTATE 44. A rerun of a faulted data cycle (RTE with a rerun bit set in SSWB) will be considered by micro bus controller 18 as a T0 data cycle. This is done because the old address stored in AOBA will be restored on the last microinstruction of an RTE and the address for the rerun of the faulted cycle will be destroyed. Any data state can be interrupted for exception processing. The following are the data states for DSTATE 44.

State DS0 is used as the reset state. There are three exit conditions:

(1) Data Request (T1 or T3) from the microcode & T4=1. Under this condition, the next state will be DS1.
(2) Data Request (T1 or T3) from the microcode & T4=0 (implied T2) & Request Not Accepted. Under this condition, the next state will be DS2.
(3) Restore Request from the microcode. This indicates that the microcode is ready to restore the SSWB. Under this condition, the next state will be DS5.

DS0 is forced by a LDNOP.

| Condition | Actions |
|---|---|
| T1 or T3 Data Request & T4=1 | Go to DS1. |
| T1 or T3 Data Request & T4=0 (implies T2) & Request Not | Go to DS2. |

| Condition | Actions |
| --- | --- |
| Accepted Restore Request | Go to DS5. |
| No Data Request & No Restore Request | Remain in DS0. |

State DS1 is used to indicate that the Data request (T1 or T3) has been received from the microcode. Since the request is received in T4 and the clocks may be in T4-T4bar sequencing, this is not a data pending state. As long as T4-T4bar sequencing is occurring, this state will be maintained. If micro bus controller 18 accepts the data cycle then the next state will be DS0 at T2 time in the case of a T1 data request.

If the request is not accepted and T4=0 (implied T2), then the next state will be DS2.

| Condition | Actions |
| --- | --- |
| T4=1 | Remain in DS1. |
| Request Accepted | Go to DS0. |
| T4=0 (implied T2) & Request Not Accepted | Go to DS2. |

State DS2 is used to indicate that a data cycle is pending. As long as the data cycle is not accpeted by micro bus controller 18, the clocks will be held. This state is only exited when micro bus controller 18 accepts the data cycle.

| Condition | Actions |
| --- | --- |
| Request Accepted | Go to DS0. |
| Request Not Accepted | Remain in DS2. |

State DS5 is used to allow restoration of the SSWB during the execution of an RTE. This state is maintained until the last microinstruction of the RTE when a Return is excecuted, several different actions can take place:
  (1) If a pending bit of the SSWB is clear, then the next state will be DS0 and DSTATE 44 will resume normal sequencing.
  (2) If the pending bit is set, then the next state will be DS2.

| Condition | Actions |
| --- | --- |
| No Return | Remain in DS5. |
| Return & No Pending | Go to DS0. |
| Return & Pending | Go to DS2 |

The following is a list of inputs for DSTATE 44:
  RETURN—Data State Return. This input occurs on the last microinstruction of RTE and indicates that DSTATE 44 should (if necessary) initiate a rerun of the previously bus errored cycle.
  RESTREQ—Restore Request. This is an indication that the SSWB is being restored in response to an RTE.
  *DOPCNTL—Data Operand Control. This negated signal indicates that micro bus controller 18 will start an external data cycle on the next PH1.
  T4—Clock Signal.
  T1T3MRQ—T1 or T3 Data cycle request. This indicates that a T1 or T3 data cycle will be run in the next microinstruction.
  PENDING—This SSWB bit is used on the last microinstruction of an RTE to indicate that a data cycle was requested by the microcode, but was never run externally.

The following table shows the current state, the inputs sampled during that state and the next state based on those inputs.

| current state | RETURN | RESTREQ | *DOPCNTL | T4 | T1T3MRQ | PENDING | next state |
| --- | --- | --- | --- | --- | --- | --- | --- |
| DS0 | X | 0 | X | X | 0 | X | DS0 |
|  | X | X | 0 | 0 | 1 | X | DS0 |
|  | X | X | X | 1 | 1 | X | DS1 |
|  | X | X | 1 | 0 | 1 | X | DS2 |
|  | X | 1 | X | X | X | X | DS5 |
| DS1 | X | X | 0 | X | X | X | DS0 |
|  | X | X | 1 | 1 | X | X | DS1 |
|  | X | X | 1 | 0 | X | X | DS2 |
| DS2 | X | X | 0 | X | X | X | DS0 |
|  | X | X | 1 | X | X | X | DS2 |
| DS5 | 1 | X | X | X | X | 0 | DS0 |
|  | 1 | X | X | X | X | 1 | DS2 |
|  | 0 | X | X | X | X | X | DS5 |

Assigning the following coding for the data state:
  DS0=000
  DS1=001
  DS2=010
  DS3=011

Then the state table becomes:

| MBCDS2 | MBCDS1 | MBCDS0 | RETURN | RESTREQ | *DOPCNTL | T4 | T1T3MRQ | PENDING | MBCNDS2 | MBCNDS1 | MBCNDS0 |
| --- | --- | --- | --- | --- | --- | --- | --- | --- | --- | --- | --- |
| 0 | 0 | 0 | X | 0 | X | X | 0 | X | 0 | 0 | 0 |
| 0 | 0 | 0 | X | X | 0 | 0 | 1 | X | 0 | 0 | 0 |
| 0 | 0 | 0 | X | X | X | 1 | 1 | X | 0 | 0 | 1 |
| 0 | 0 | 0 | X | X | 1 | 0 | 1 | X | 0 | 1 | 0 |
| 0 | 0 | 0 | X | 1 | X | X | X | X | 0 | 1 | 1 |
| 0 | 0 | 1 | X | X | 0 | X | X | X | 0 | 0 | 0 |
| 0 | 0 | 1 | X | X | 1 | 1 | X | X | 0 | 0 | 1 |
| 0 | 0 | 1 | X | X | 1 | 0 | X | X | 0 | 1 | 0 |
| 0 | 1 | 0 | X | X | 0 | X | X | X | 0 | 0 | 0 |
| 0 | 1 | 0 | X | X | 1 | X | X | X | 0 | 1 | 0 |
| 0 | 1 | 1 | 1 | X | X | X | X | 0 | 0 | 0 | 0 |
| 0 | 1 | 1 | 1 | X | X | X | X | 1 | 0 | 1 | 0 |
| 0 | 1 | 1 | 0 | X | X | X | X | 0 | 0 | 1 | 1 |

The DSTATE 44 is implemented in a tree decode PLA. The decodes are arranged on a bit by bit basis and therefore it is only necessary to decode the terms that produce a 1 in the corresponding next state bit.

The decodes for MBCNDS0=1 are:

|  |  |  | inputs |  |  |  |  |  |
|---|---|---|---|---|---|---|---|---|
| M B C D S 2 | M B C D S 1 | M B C D S 0 | R E T U R N | R E S T R Q | D O P C N T L | • T 4 | T 1 T 3 M R Q | P E N D I N G |
| 0 | 0 | 0 | X | X | X | 1 | 1 | X |
| 0 | 0 | 0 | X | 1 | X | X | X | X |
| 0 | 0 | 1 | X | X | 1 | 1 | X | X |
| 0 | 1 | 1 | 0 | X | X | X | X | X |

The decodes for MBCNDS1=1 are:

|  |  |  | inputs |  |  |  |  |  |
|---|---|---|---|---|---|---|---|---|
| M B C D S 2 | M B C D S 1 | M B C D S 0 | R E T U R N | R E S T R Q | D O P C N T L | • T 4 | T 1 T 3 M R Q | P E N D I N G |
| 0 | 0 | 0 | X | 1 | X | X | X | X |
| 0 | 0 | 0 | X | X | 1 | 0 | 1 | X |
| 0 | 0 | 1 | X | X | 1 | 0 | X | X |
| 0 | 1 | 0 | X | X | 1 | X | X | X |
| 0 | 1 | 1 | 1 | X | X | X | X | 1 |
| 0 | 1 | 1 | 0 | X | X | X | X | X |

MBCNDS2 is a spare bit and always decodes to .

Figure 5:
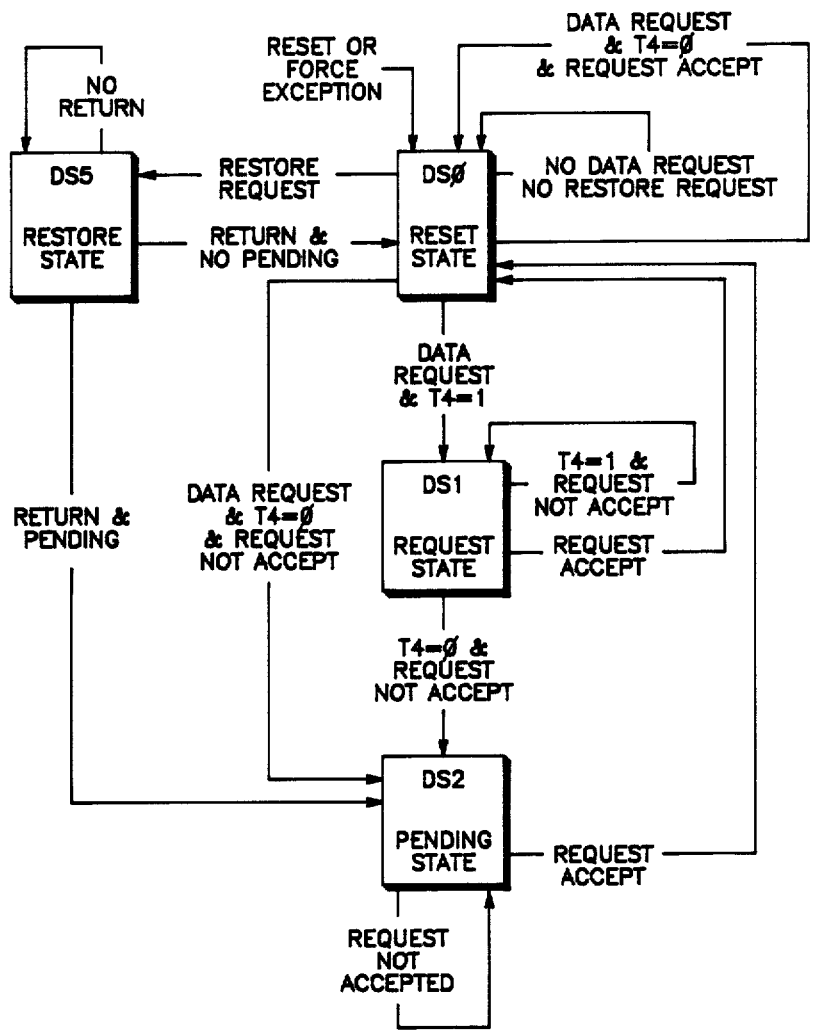
FIG. 5 is a state diagram of a data state machine forming part of the macro bus controller of FIG. 2.
Figure 6:
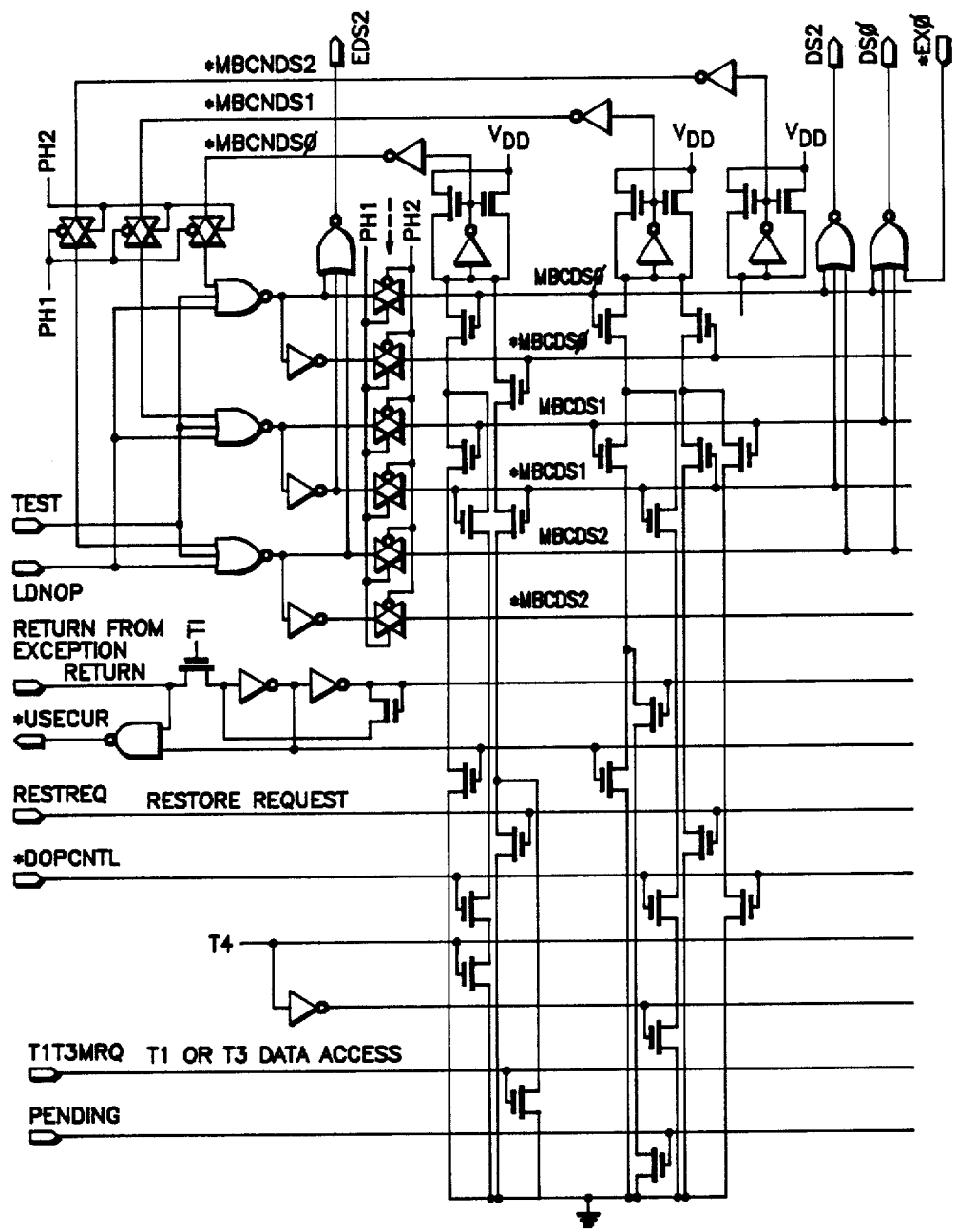
FIG. 6 is a diagram of a circuit for implementing the state diagram of FIG. 5.

A state diagram of DSTATE 44 is shown in FIG. 5 a circuit implementing the state diagram of FIG. 5 is shown in FIG. 6 DSTATE 44 provides decoding so that there is a separate signal for each state that is to be communicated outside DSTATE 44. State DS0 is communicated by signal DS0. State DS2 is communicated by signals EDS2 and DS2 with EDS2 being clocked by the PH2 preceding the PH1 which clocks DS2. States DS1 and DS5 are for purposes internal to DSTATE 44 and need not be communicated external to DSTATE 44.

EXSTATE 46 is responsible for handling any exception that is generated by macro bus controller 16. These are:
(1) Address Error—Address errors can occur if an instruction fetch is requested and the address is on an odd byte boundary. The Exception is taken at the end of the microinstruction generating the illegal access. Microcomputer 10 requires that all instructions be located at even byte boundary addresses.
(2) Data Cycle bus Error—Any Data bus cycle (as opposed to an Instruction bus cycle) that is bus errored generates a Data cycle bus error exception. This exception can occur many microinstructions after the microinstruction that initiated the data operation.
(3) Pipe Error—When instruction fetches are bus errored, the information that the destination register of the fetch is invalid is retained in the SSWB. If that register will be used in a following microinstruction, a Pipe Error exception is generated.

EXSTATE 46 has sole control over generating LDNOP, the key signal that initiates exception processing. In addition, EXSTATE 46 is responsible for collecting information about which exception(s) occurred and what the status of macro bus controller 16 and micro bus controller 18 is. This information is preserved in the SSWB for later exception processing. A LDNOP serves to reset ISTATE 42 and DSTATE 44.

State EX0 is the reset state. There are only two exit conditions:
(1) The occurrence of any exception (Pipe Error, Address Error, or Data cycle bus error). Under this condition, the next state will be EX1 and an exception is considered pending.
(2) A Restore Request from the Microcode. Under this condition, the next state will be EX6.

State EX1 is used to indicate that an exception has occurred (pending). One function of this state is to monitor the actions of ISTATE 42, and the status of micro bus controller 18 to see if they are both in stable states. This is necessary before a LDNOP is generated since this will interrupt all bus activity. In addition, state EX1 will stop the clocks, and terminate any pending requests to micro bus controller. If the rest of the bus controller is in a stable state, then the next state will be EX2.

State EX2 is used to capture the status of macro bus controller 16 and micro bus controller 18 in SSWB. The next (unconditional) state will be EX3.

States EX3 and EX4 are used to generate a LDNOP to reset macro bus controller 16 and micro bus controller 18 and initiate exception processing. Two states (two cycled) may not be necessary to generate LDNOP, but this will depend on system design contraints of the user.

State EX5 is a holding state to wait for the microcode to unload the bus status contained in SSWB. Another function of this state is to hold off any Pipe Errors until the pipe has been unloaded.

State EX6 is used to allow the microcode to restore the state of SSWB during RTE processing. At the last microinstruction of an RTE, a Return is executed.

EXSTATE 46 samples inputs on PH2 and changes state on PH1. The inputs used by the EXSTATE 46 are as follows:
RETURN—Return from exception. This occurs on the last microinstruction of an RTE and indicates that the SSWB has been restored.
RESTREQ—Restore Request. This is an indication that the SSWB is being restored in response to an RTE.
T4—Clock signal.
*DBUSERR—Data Bus Error. This active low signal indicates that the data cycle currently running has been bus errored.
OPCYCOM—Operand Cycle Complete. This signal indicates that micro bus controller 18 has completed the last access.
*VIHOLDS—Valid Instruction Hold State. This active low signal indicates that ISTATE 42 is in a valid holding state and can be interrupted for exception processing.
PAAEX—Pipe error (PIPERR), Address error (ADDERR), or some other interrupt caused by an external device on an auto vector pin (AVI). This active high signal indicates any of the above exceptions has occurred.

The following state table shows the current state, the inputs sampled during that state, and the next state based on those inputs.

| current state | inputs | | | | | | | next state |
|---|---|---|---|---|---|---|---|---|
| | RETURN | RESTREQ | T4 | DBUSERR | OPCYCM | VIHOLDS | PAAEX | |
| EX0 | X | 0 | X | 1 | X | X | 0 | EX0 |
| | X | X | X | 0 | X | X | X | EX1 |
| | X | X | X | X | X | X | 1 | EX1 |
| | X | 1 | X | X | X | X | X | EX6 |
| EX1 | X | X | 0 | X | X | X | X | EX1 |
| | X | X | X | X | 0 | X | X | EX1 |
| | X | X | X | X | X | 1 | X | EX1 |
| | X | X | 1 | X | 1 | 0 | X | EX2 |
| EX2 | X | X | X | X | X | X | X | EX3 |
| EX3 | X | X | X | X | X | X | X | EX4 |
| EX4 | X | X | X | X | X | X | X | EX5 |
| EX5 | X | X | X | X | X | X | X | EX5 |
| EX6 | 1 | X | X | X | X | X | X | EX0 |
| | 0 | X | X | X | X | X | X | EX6 |

Assigning the following coding for the exception states:
EX0=000
EX1=010
EX2=011
EX3=101
EX4=100
EX5=111
EX6=110

Then the state table becomes:

| MBCES2 | MBCES1 | MBCES0 | RETURN | RESTREQ | T4 | DBUSERR | OPCYCM | VIHOLDS | PAAEX | MBCNES2 | MBCNES1 | MBCNES0 |
|---|---|---|---|---|---|---|---|---|---|---|---|---|
| 0 | 0 | 0 | X | 0 | X | 1 | X | X | 0 | 0 | 0 | 0 |
| 0 | 0 | 0 | X | X | X | 0 | X | X | X | 0 | 1 | 0 |
| 0 | 0 | 0 | X | X | X | X | X | X | 1 | 0 | 1 | 0 |
| 0 | 0 | 0 | X | 1 | X | X | X | X | X | 1 | 1 | 0 |
| 0 | 1 | 0 | X | X | 0 | X | X | X | X | 0 | 1 | 0 |
| 0 | 1 | 0 | X | X | X | X | 0 | X | X | 0 | 1 | 0 |
| 0 | 1 | 0 | X | X | X | X | X | 1 | X | 0 | 1 | 0 |
| 0 | 1 | 0 | X | X | 1 | X | 1 | 0 | X | 0 | 1 | 1 |
| 0 | 1 | 1 | X | X | X | X | X | X | X | 1 | 0 | 1 |
| 1 | 0 | 1 | X | X | X | X | X | X | X | 1 | 0 | 0 |
| 1 | 0 | 0 | X | X | X | X | X | X | X | 1 | 1 | 1 |
| 1 | 1 | 1 | X | X | X | X | X | X | X | 1 | 1 | 1 |
| 1 | 1 | 0 | 1 | X | X | X | X | X | X | 0 | 0 | 0 |
| 1 | 1 | 0 | 0 | X | X | X | X | X | X | 1 | 1 | 0 |

The EXSTATE 46 is implemented in a tree decode PLA. The decodes are arranged on a bit by bit basis and therefore it is only necessary to decode terms that produce a 1 in the corressponding next state bit.
The decodes for MBCNES0=1 are:

| MBCES2 | MBCES1 | MBCES0 | RETURN | RESTREQ | T4 | DBUSERR | OPCYCM | VIHOLDS | PAAEX |
|---|---|---|---|---|---|---|---|---|---|
| 0 | 1 | 0 | X | X | 1 | X | 1 | 0 | X |
| 0 | 1 | 1 | X | X | X | X | X | X | X |
| 1 | 0 | 0 | X | X | X | X | X | X | X |
| 1 | 1 | 1 | X | X | X | X | X | X | X |

The decodes for MBCNES1=1 are:

| MBCES2 | MBCES1 | MBCES0 | RETURN | RESTREQ | T4 | DBUSERR | OPCYCM | VIHOLDS | PAAEX |
|---|---|---|---|---|---|---|---|---|---|
| 0 | 0 | 0 | X | X | X | 0 | X | X | X |
| 0 | 0 | 0 | X | X | X | X | X | X | 1 |
| 0 | 0 | 0 | X | 1 | X | X | X | X | X |
| 0 | 1 | 0 | X | X | 0 | X | X | X | X |
| 0 | 1 | 0 | X | X | X | X | 0 | X | X |
| 0 | 1 | 0 | X | X | X | X | X | 1 | X |
| 0 | 1 | 0 | X | X | 1 | X | 1 | 0 | X |
| 1 | 0 | 0 | X | X | X | X | X | X | X |
| 1 | 1 | 1 | X | X | X | X | X | X | X |
| 1 | 1 | 0 | 0 | X | X | X | X | X | X |

The decodes for MBCNES2=1 ARE:

| MBCES2 | MBCES1 | MBCES0 | RETURN | RESTREQ | T4 | DBUSERR | OPCYCM | VIHOLDS | PAAEX |
|---|---|---|---|---|---|---|---|---|---|
| 0 | 0 | 0 | X | 1 | X | X | X | X | X |
| 0 | 1 | 1 | X | X | X | X | X | X | X |
| 1 | 0 | 1 | X | X | X | X | X | X | X |
| 1 | 0 | 0 | X | X | X | X | X | X | X |
| 1 | 1 | 1 | X | X | X | X | X | X | X |
| 1 | 1 | 0 | 0 | X | X | X | X | X | X |

Figure 7:
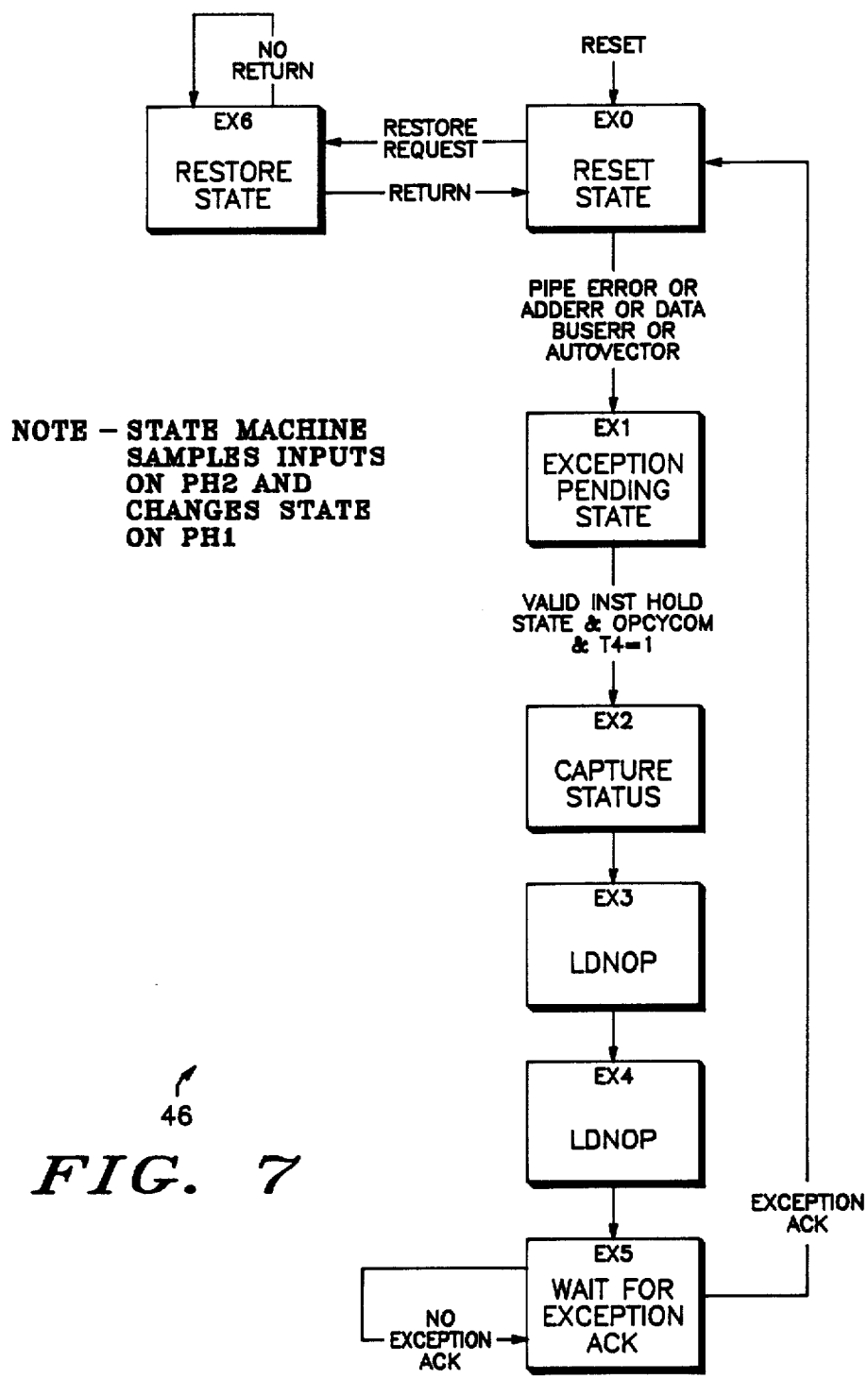
FIG. 7 is a state diagram of an exception state machine forming part of the macro bus controller of FIG. 2.
Figure 8:
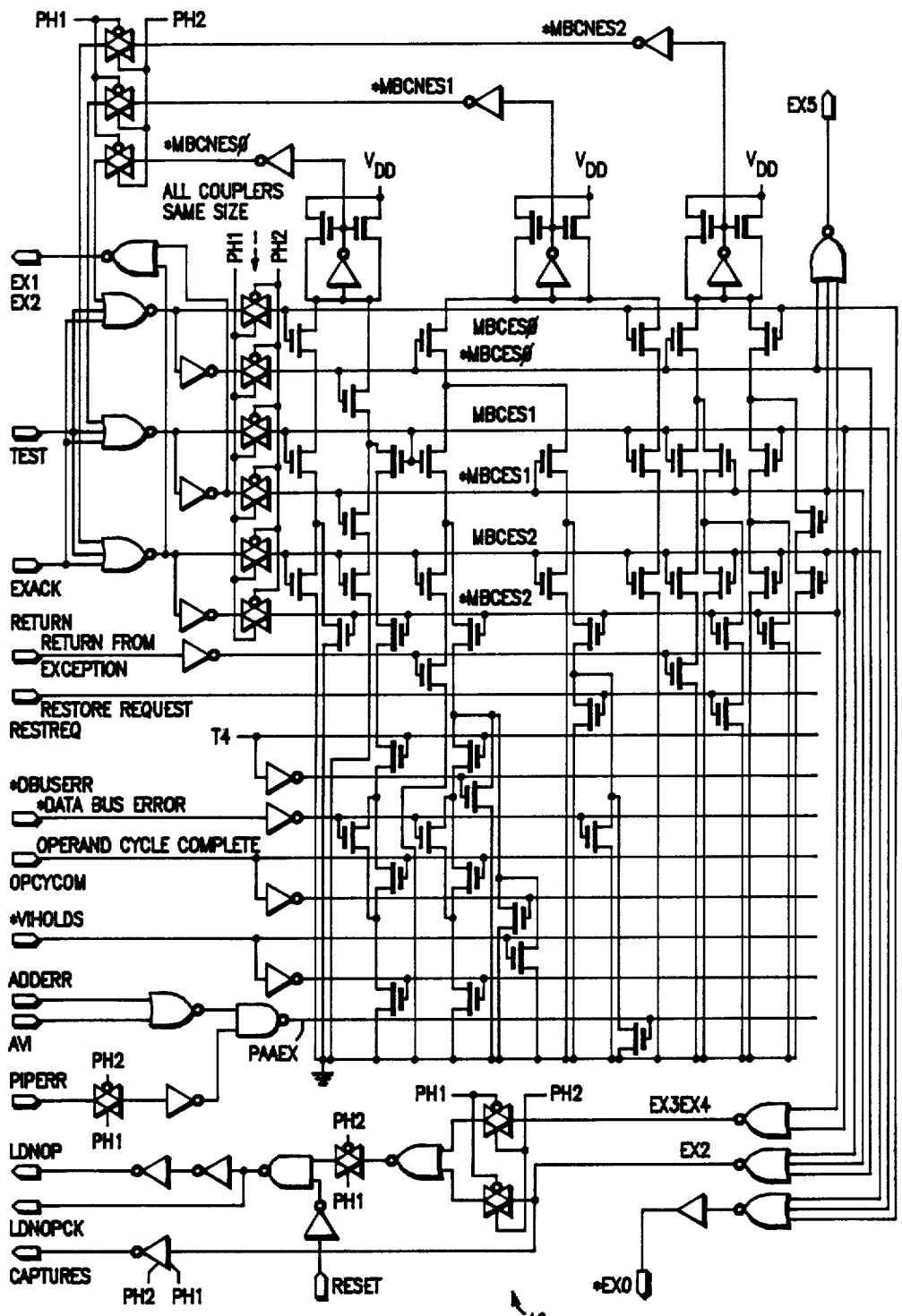
FIG. 8 is a diagram of a circuit for implementing the state diagram of FIG. 7.
Figure 9:
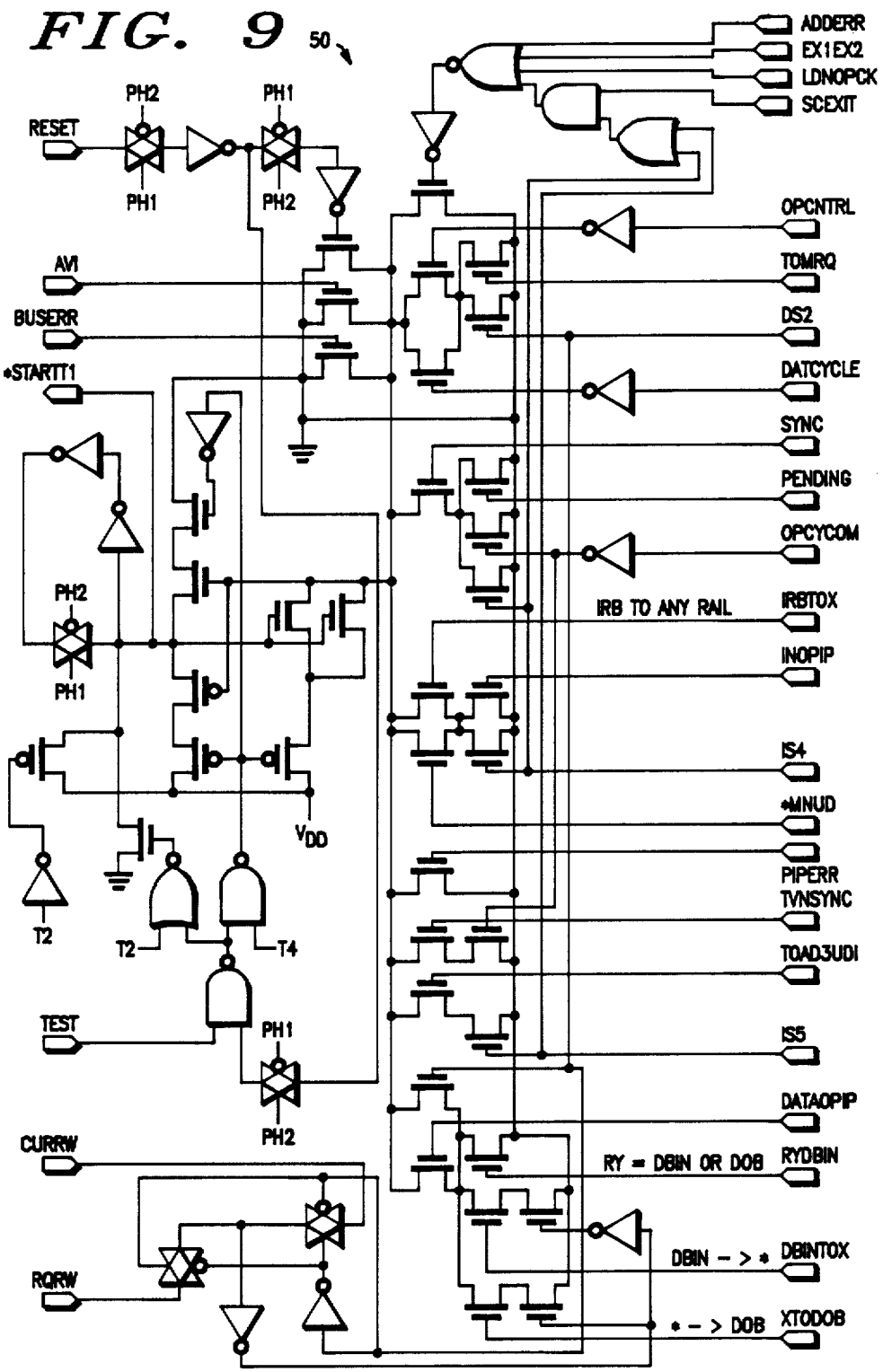
FIG. 9 is a circuit diagram of a clock controller forming part of the macro bus controller of FIG. 2.

A state diagram of EXSTATE 46 is shown in FIG. 7. A circuit for implementing the state diagram of FIG. 7 is shown in FIG. 8. EXSTATE 46 includes additional decoding so that necessary information as to the state of EXSTATE 46 is communicated outside EXSTATE 46. State EX0 is indicated by negated signal *EX0. An EX1 EX2 signal is provided when either state EX1 or state EX2 is present. Signal CAPTURES is provided to indicate state EX2. Singals LDNOP and LDNOPCK are provided to indiate either state EX2, EX3, or EX4 is present or signal RESET has occurred. State EX5 is indicated by signal EX5.

CLK CNTRL 50 has sole control over halting the internal clocks. There can be many conditions that necessitate clock halt (T4-T4bar sequencing). In general, these fall into two categories—Incomplete Accesses and Exceptions.

Some exception conditions that will cause a clock halt are as follows:

BUSERR—Bus Error. Any bus error will cause a clock halt. Bus errors that occur on instruction fetches will be cleared out of micro bus controller 18 by hardware, but the clock halt time is necessary to allow the bus error to propagate through the pipe error logic.

PIPERR—Pipe Error. A pipe error occurs when an instruction prefetch register in the pile (IRB or IRC) contains invalid data and that register will be used in the next microinstruction. Since these registers are not necessarily used in any given microinstruction, a bus error on an instruction fetch will not necessarily result in a pipe error.

AVI—Auto Vector Internal. Internal signal of signal received on an auto vector pin of microcomputer 10. Although, strictly speaking, an auto vector is not an exception, it is handled by the same mechanism, and will cause both a clock halt and a LDNOP.

ADDERR—Address Error. Any instruction fetch to an odd byte address will cause an address error to occur immediately in the microinstruction that initiates the request.

Incomplete accesses that necessitate a clock halt include the following:

(*DATACYCLE or *OPCNTRL) and (T0MRQ or DS2)—This combination of signals is used to stop the clocks in the case where a data fetch is required but the Micro Bus Controller is not ready to start the data cycle.

DATACYCLE is a signal from PRIORITY 48 that indicates that data cycles have priority for this clock cycle if the micro bus controller 18 is ready to start a bus cycle.

OPCNTRL is a signal from the micro bus controller 18 that indicates that a bus cycle will be initiated on the next PH1.

T0MRQ indicates a T0 data operation will occur in the next microinstruction. When this occurs, the clocks will be halted unless the next PH1 is a T2 and the data cycle will start on the next PH1.

DS2 is a data state that indicates that a T1 or T3 data operation has been requested by the microcode, but the micro bus controller 18 has not yet initiated the cycle.

(IRBTOX or *MNUD) and (INOPIP or IS4)—This combination of signals is used to detect the case where an instruction fetch has been requested and has not been completed, and the next microinstruction has an operation that necessitates completion of the current instruction fetch.

IRBTOX indicates that IRB will be read into data part 40 of execution unit 12 in the next microinstruction. If the current instruction fetch is not complete, then IRB is not valid, and clocks must be halted until the instruction fetch is complete.

MNUD indicates that there is no instruction prefetch operation in the next microinstruction. If any instruction operation is requested in the next microinstruction (*MNUD) and the current instruction operation is not complete (INOPIP or IS4), then clocks must be halted.

INOPIP is a signal that indicates that the micro bus controller 18 is currently executing an instruction fetch.

IS4 is an instruction state that indicates that at some previous time an instruction fetch was initiated, but was not accepted by micro bus controller 18.

Shown in FIG. 6 is a circuit for implementing CLK CNTRL 50.

Figure 10:
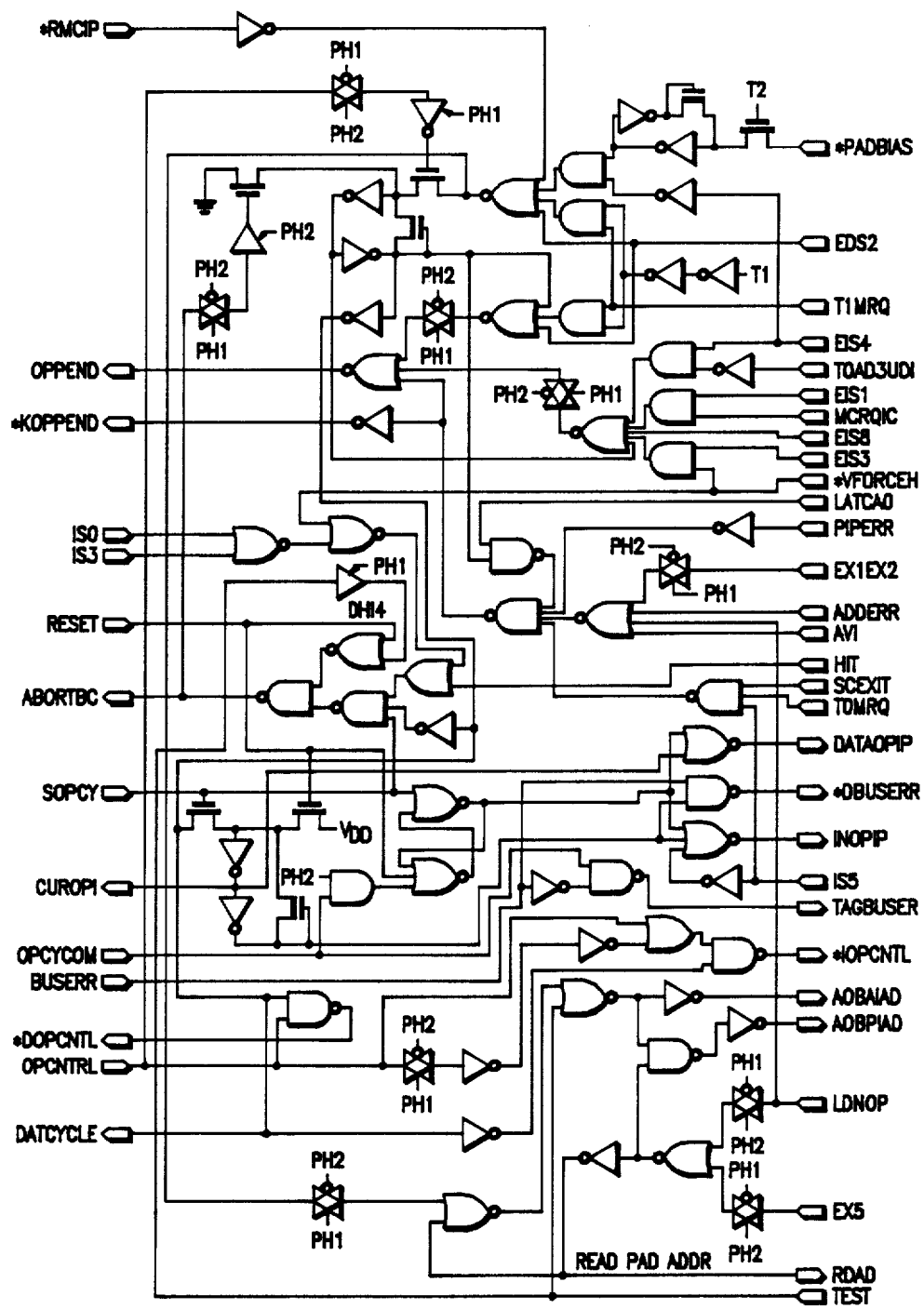
FIG. 10 is a circuit diagram of a priority machine forming part of the macro bus controller of FIG. 2.

Shown in FIG. 10 is a circuit diagram for implementing PRIORITY 48. The primary function of PRIORITY 48 is to decide between running a data bus cycle or an instruction bus cycle and when to execute such decision. Such decision as to when to run a bus cycle is communicated to micro bus controller 18 by a signal OPPEND. Whenever micro bus controller 18 receives OPPEND, micro bus controller 18 will begin running a bus cycle. PRIORITY 48 provides signals AOBAIAD and AOBPIAD to indicate between a data bus cycle and an instruction bus cycle to multiplexer 22. AOBAIAD indicates a data cycle is to be run, whereas AOBPIAD indicates an instruction data cycle is to be run. Only one of the two can be present at a time, but there are occasions when neither are present. If either LDNOP or EX5 are present, neither AOBAIAD nor AOBPIAD are present.

If neither LDNOP nor EX5 are present, then one of AOBAIAD and AOBPIAD will be present. In such case AOBAIAD will be present if one of following conditions are present:

(1) * PADBIAS=0, and EIS4=0
(2) *RMCIP=0
(3) T1MRQ=1 and T1
(4) EDS2=1

The *PADBIAS signal is a negated signal generated by microcode to indicate that data bus cycles have a higher priority than is likely to have been otherwise indicated. PADBIAS occurs when the microcode knows that the address has already been calculated and is available for transfer to address interface 26, and a T0 data request is to take place in the next microinstruction. This can be particularly useful in co-processor applications in which operands are to be transferred between the co-processor and memory and/or between the co-processor and microcomputer 10. Another situation is saving and restoring the state of microcomputer 10. These are situations in which there are likely to be numerous consecutive data bus cycles. Consequently, the delay is saved in switching multiplexer 22 from coupling an instruction address to coupling a data address to address interface 26. If both an instruction request and a data request are pending, the instruction typically has priority so that address interface 26 is receiving the instruction address but is not coupling the address to external memory. If there is not a hit in cache 20, the address interface 26 can couple the instruction to external memory at the next clock. If there is a hit in cache 20, then multiplexer 22 is switched to couple the data address to address interface 26 on the next clock so that address interface can couple the data address to external memory on the clock following that. This has the effect of delaying the data bus cycle by one clock cycle, i.e., one PH1 plus one PH2. If *PADBIAS is present and EIS4=0, then multiplexer 22 is coupling the data address to address interface 26 prior to the beginning of the bus cycle which has the effect of saving the extra clock cycle which is normally required to begin a data bus cycle. The presence of *PADBIAS has the effect then of altering the priority set by macro bus controller 16 under the established criterion. Such alternation, however, is not absolute If EIS4 is also present, the current microinstruction contains a request for an instruction as well as indicating that a T0 data request is in the next microinstruction. In such a case the current request for an instruction has priority so that AOBAIAD is not generated.

The *RMCIP signal is a negated read/modify write in progress signal. Microcomputer 10 requires that read/modify writes can only operate on data and not instructions. This signal is set by microcode.

T1MRQ and EDS2 are indicative of data requests T1MRQ is a T1 request and EDS2 is the request indicated by state DS2.

If neither LDNOP and EX5 are present and if AOBAIAD is not present, then AOBPIAD is present to cause multiplexer 22 to couple the instruction address to address interface 26.

OPPEND is generated in response to certain bus cycle requests when the relevant exception conditions are not present. When the relevant exception conditions are not present and AOBAIAD is present, OPPEND will occur if any, of the following conditions are met:
 (1) EDS2
 (2) T1MRQ and T1

When the relevant exceptions are not present and AOBPIAD is present, OPPEND will occur if any of the following conditions are met:
 (1) EDIS4 and not TOAD3UDI
 (2) E1S1 and MCRQIC
 (3) EIS8
 (4) EIS3 and *VFORCEH Any one of the following exceptions will prevent OPPEND from occurring:
 (1) LATCAO and AOBAIAD
 (2) PIPERR
 (3) EX1EX2
 (4) ADDERR
 (5) LODNOP
 (6) AVI
 (7) SCEXIT T0MRQ and IS5

These same conditions which prevent OPPEND also cause a negated kill OPPEND signal *KOPPEND.

An abort bus cycle signal ABORTBC is generated primarily for the case in which an instruction as priority but hits in cache 20. In such a case, if there is also a pending data request, it is advantageous to abort the instruction access and perform a data bus cycle to service the pending data access because the instruction is available in cache 20. Before the external memory is made to respond to an address as controlled by control interface 30 which in turn is controlled by micro bus controller 18, the instruction bus cycle is aborted. The data address can then be coupled to address interface 26. A bus cycle begins internally before the external memory responds. The external memory responds in reponse to the control exerted by control interface 30. A bus cycle can be aborted at a time prior to control interface 30 providing the signals which cause external memory to respond but not after. ABORTBC is provided under any one of the following conditions:
 (1) RESET
 (2) TEST
 (3) SOPCY and AOBPIAD and (HIT or (*VFORCEH and (ISO or TS3)))

The logic present in FIG. 10 for implementing PRIORITY 48 is advantageously used for generating other signals than those described. These additional signals are for use in other parts of microcomputer 10.

Macro controller 16 thus provides dynamic prioritizing of data and instruction request. The data requests are maintained in DSTATE 44 and instruction requests in ISTATE 42. Consequently options are thus available for determining priority between them instead of simply running bus cycles in the sequence provided by microcode. Another advantage of macro controller 16 is the ability to respond in advance to situations in which a branch or change of flow is to occur. Instead of simply running bus cycles in the order received, macro controller 16 actually stops progress on requests known to be prior to the upcoming branch. Consequently, instead of running data or instruction fetches that are going to be without value, priority is given to the instruction fetch which will provide the valid instructions. The pipe is filled more quickly with valid instructions so that the delay due to a branch is substantially reduced. Not only can priority be dynamically given to instruction fetches but also to data bus cycles in appropriate circumstances. Information that a certain type of data cycle is going to be run is used to advantage. In macro controller 16 a special data access known as a T0 access is given special priority. The T0 access can be used advantageously to reduce delay time. This is particularly useful when a number of data cycles are going to be run consecutively. By defining in advance that the special data access will occur, circuit preparation is achieved which reduces the time required to run the data bus cycle.

We claim:

1. A data processor comprising:
 instruction execution control means for executing each of a plurality of instructions and, prior to completion of the execution of each of said instructions, requesting a transfer of a next one of said instructions, and
 a bus controller, connected to the instruction execution control means and adapted to be connected to a memory external to said microcomputer, said memory storing a predetermined set of said instructions, the bus controller receiving said requests from said instruction execution control means for the transfer of said instructions, storing said received transfer requests in a transfer request queue, and performing each of said requested transfers of said instructions between said memory and said instruction execution control means in accordance with the respective transfer request in said transfer request queue,
characterized:
 in that the instruction execution control means provides a first control signal during the execution of a first predetermined one of said instructions, and
 in that the bus controller, in response to said first control signal, flushes all of said transfer requests stored in said transfer request queue.

2. The data processor of claim 1 wherein the instruction execution control means provides a second control signal in response to detecting an exception condition during the execution of any of said instructions, and in that the bus controller, in response to said second control signal, saves in a predetermined area all of said transfer requests stored in said transfer request queue.

3. The data processor of claim 2 wherein the instruction execution control means provides a third control signal during the execution of a second predetermined one of said instructions, and in that the bus controller, in response to said third control signal, restores in said transfer request queue all of said transfer requests saved in said predetermined area.

4. The data processor of claim 3 wherein the third control signal comprises a queue restore signal.

5. The data processor of claim 2 wherein the second control signal comprises a queue save signal.

6. The data processor of claim 1 wherein the first control signal comprises a change of flow signal.

7. The data processor of claim 1 wherein the first control signal comprises a queue flush signal.

* * * * *